United States Patent
Esashi et al.

(10) Patent No.: US 6,679,118 B1
(45) Date of Patent: Jan. 20, 2004

(54) ACCELEROMETER AND SPHERICAL SENSOR TYPE MEASURING INSTRUMENT

(75) Inventors: Masayoshi Esashi, Miyagi (JP); Takao Murakoshi, Tokimec Inc. 16-46, Minami Kamata 2-chome, Ohta-ku, Tokyo (JP), 144-0035; Shigeru Nakamura, Tokyo (JP); Nobuo Takeda, Chiba (JP)

(73) Assignees: Tokimec Inc., Tokyo (JP); Ball Semiconductor Limited, Chiba (JP); Takao Murakoshi, Miyagi (JP)

(*) Notice: Subject to any disclaimer, the term of this patent is extended or adjusted under 35 U.S.C. 154(b) by 0 days.

(21) Appl. No.: 10/019,126

(22) PCT Filed: Apr. 27, 2000

(86) PCT No.: PCT/JP00/02794

§ 371 (c)(1),
(2), (4) Date: Jun. 18, 2002

(87) PCT Pub. No.: WO00/65360

PCT Pub. Date: Nov. 2, 2000

(30) Foreign Application Priority Data

Apr. 27, 1999 (JP) .......................................... 11/120259

(51) Int. Cl.$^7$ ............................................. G01P 15/125
(52) U.S. Cl. .................................. 73/514.32; 73/514.18
(58) Field of Search ....................... 73/514.32, 514.18, 73/514.17; 200/61.45 R, 61.52

(56) References Cited

U.S. PATENT DOCUMENTS

| | | | |
|---|---|---|---|
| 3,438,267 A | 4/1969 | Contensou et al. | |
| 3,680,392 A | 8/1972 | Hoffman et al. | |
| 3,742,767 A | 7/1973 | Bernard et al. | |
| 4,393,710 A | 7/1983 | Bernard | |
| 4,583,404 A | * 4/1986 | Bernard et al. | ........... 73/514.18 |
| 4,869,092 A | * 9/1989 | Bernard et al. | ............... 73/1.38 |
| 5,710,376 A | * 1/1998 | Weber, Jr. | ................. 73/514.32 |
| 5,719,335 A | 2/1998 | Nakaishi et al. | |
| 6,505,409 B2 | * 1/2003 | Toda et al. | ............... 33/366.24 |

FOREIGN PATENT DOCUMENTS

| | | |
|---|---|---|
| DE | 2204533 | 8/1972 |
| DE | 3147011 | 7/1982 |
| FR | 2124055 | 9/1972 |
| FR | 2495328 | 6/1982 |
| GB | 1317868 | 5/1973 |
| GB | 2088564 | 6/1982 |
| JP | 57-146166 | 9/1982 |
| JP | 7-71965 | 3/1995 |
| JP | 10-332738 | 12/1998 |
| SU | 429598 | 5/1974 |
| SU | 1308206 | 4/1987 |

* cited by examiner

*Primary Examiner*—Richard A. Moller
(74) *Attorney, Agent, or Firm*—Frommer Lawrence & Haug LLP; William S. Frommer

(57) ABSTRACT

An object is to provide an accelerometer or a spherical sensor-type measurement device, able to control by means of an active restraining control system a spherical mass part or a spherical sensor part. The accelerometer or spherical sensor-type measurement device has a spherical mass part, which is levitated by electrostatic supporting forces, and electrodes positioned so as to surround the spherical mass part and which have spherical inner surfaces; the above electrodes include a plurality of electrostatic supporting electrodes, positioned symmetrically with respect to the spherical mass part, and a displacement detection electrode, positioned between the electrostatic supporting electrodes.

18 Claims, 12 Drawing Sheets

F I G. 1A
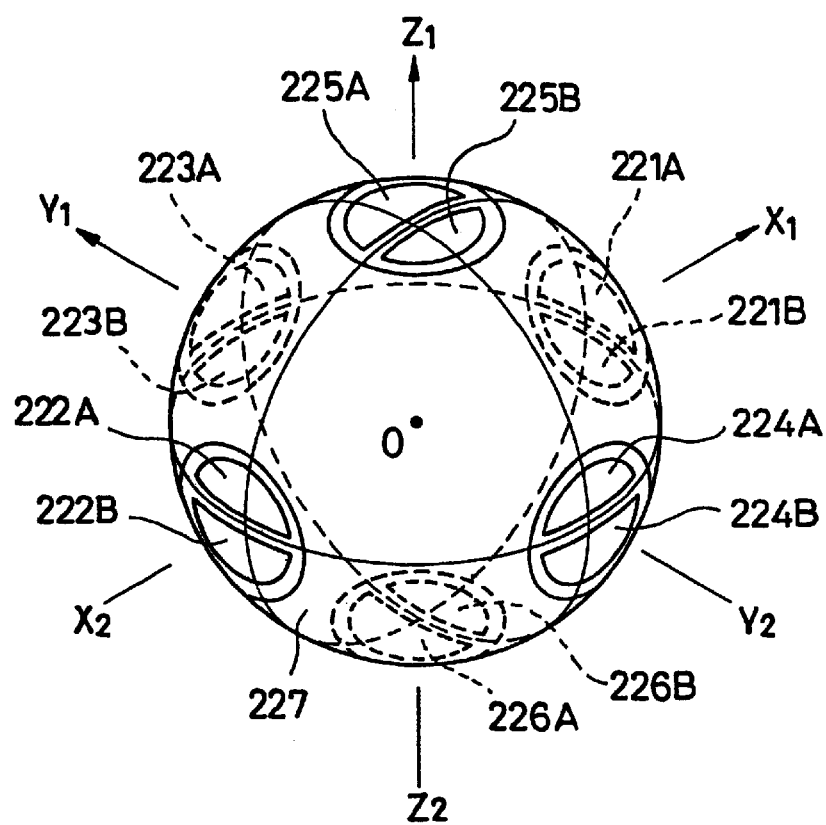
F I G. 1B
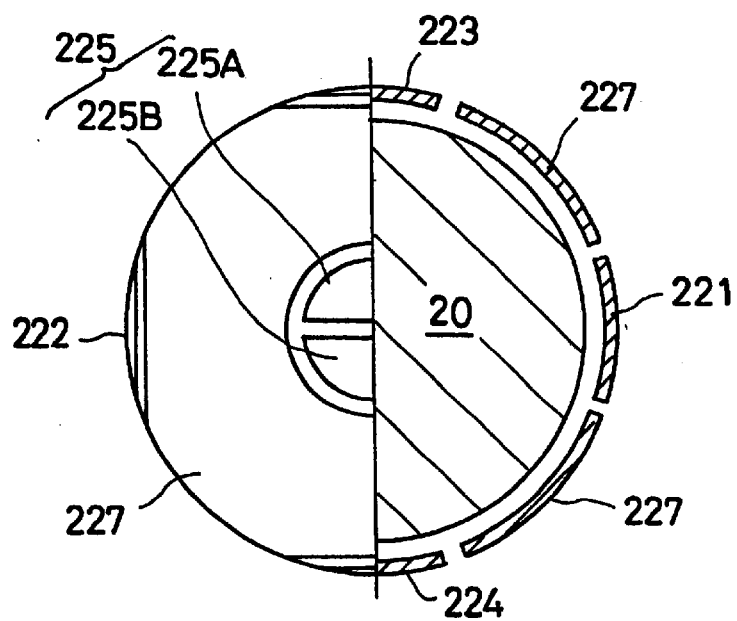

$$C_0 \fallingdotseq \frac{\varepsilon S_0}{\delta}$$

ACCELEROMETER AND SPHERICAL SENSOR TYPE MEASURING INSTRUMENT

TECHNICAL FIELD

This invention relates to an accelerometer or an acceleration detection-type sensor device, suitable for use in automobiles, ships, airplanes, and other moving bodies, for detection of acceleration in an inertial space. More specifically, this invention relates to an extremely small accelerometer or acceleration detection-type sensor device, of a form in which a spherical sensor part is supported buoyantly by an electrostatic supporting force.

BACKGROUND ART

An electrostatic gyro having a spherical gyro rotor and an electrostatic accelerometer are disclosed in Japanese Patent Application No. 3-118652, filed May 23, 1991 (Japanese Patent Laid-open No. 4-346021). This electrostatic gyro and electrostatic accelerometer comprises a spherical gyro rotor, and an electrostatic levitation startup device which levitates and holds the gyro rotor by means of electrostatic forces.

In general, active methods employing servo circuits, and passive methods employing resonance circuits, are known as methods to levitate and hold in a fixed position a gyro rotor or sensor part by means of electrostatic forces. In this example of the background art, a levitation method employing a resonance circuit is used.

In Japanese Patent Application No. 6-136074, filed Jun. 17, 1994 (Japanese Patent Laid-open No. 07-071965), the applicants of which are the present applicants, an electrostatic gyro device having a disc-shape gyro rotor is disclosed. In this example of the background art, a levitation method employing a servo circuit is used.

In the electrostatic gyros having spherical gyro rotors and electrostatic accelerometers of the background art, plate-shape electrodes were used. Hence the gap between the spherical gyro rotor and the electrodes was not fixed, and consequently there was the defect that the capacitance of the capacitor formed by the gyro rotor and the electrodes was small.

A restraining control system using a resonance circuit has a defect that various errors occur in the path from the power supply to the gyro rotor. Such errors include the occurrence of stray capacitances accompanying larger wiring and coils.

On the other hand, levitation methods employing servo circuits are used in electrostatic gyro devices having disc-shape gyro rotors; however, they have not been used in spherical sensor-type measurement devices having spherical sensor parts.

In light of these points, an object of this invention is to provide a spherical sensor-type measurement device or accelerometer in which the electrodes are formed in spherical shape, and the gap between the electrodes and the spherical mass part or the spherical sensor part is fixed.

In light of these points, an object of this invention is to provide an accelerometer capable of controlling the spherical sensor part by means of an active constraining control system.

In light of these points, an object of this invention is to provide a spherical sensor-type measurement device having an active constraining control system, as opposed to conventional passive constraining control systems.

DISCLOSURE OF THE INVENTION

The accelerometer of this invention comprises a spherical mass part of single-crystal or polycrystalline silicon, levitated by an electrostatic supporting force, and a plurality of electrodes positioned symmetrically so as to surround the spherical mass part, and having spherical inner surfaces.

According to this invention, an accelerometer comprises a plurality of the above electrostatic supporting electrodes and an electrode for displacement detection, positioned between the electrostatic supporting electrodes. Further, each of the above electrostatic supporting electrodes comprises a pair of electrode parts. The above electrostatic supporting electrodes comprise six electrostatic supporting electrodes, positioned along three mutually orthogonal axes.

According to this invention, in the accelerometer, the above electrostatic supporting electrodes and the above displacement detection electrode are mutually connected by a bridge positioned on the outside in the radial direction, formed in an integral structure. The above electrostatic supporting electrodes and the above displacement detection electrode are supported by a spherical shell-shape casing. On the outer surface of the above casing are arranged terminals connected to the above electrostatic supporting electrodes and the above displacement detection electrode, and an electrical wiring pattern connected to the terminals. The end parts of the above electrical wiring pattern form a prescribed array at a prescribed position on the outer surface of the above casing.

The accelerometer of this invention has:
  a spherical mass part which is levitated by an electrostatic supporting force;
  electrostatic supporting electrodes, positioned so as to surround the spherical mass part, and a displacement detection electrode, positioned between the electrostatic supporting electrodes;
  a control operation part, which applies a control DC voltage to the above electrostatic supporting electrodes in order to generate the above electrostatic supporting force, and a displacement detection system, which applies to the above electrostatic supporting electrodes a displacement detection AC voltage, superposed on the above control DC voltage, which detects displacement detection current flowing in the above displacement detection electrode, and which generates a displacement detection voltage signal instructing a displacement of the above spherical mass part; and,
  an acceleration output operation part which inputs the signal output by the above control operation part and operates the acceleration output; and in which
  the above control operation part inputs the above displacement detection voltage signal output by the above displacement detection circuit, operates the correction amount for the above control DC voltage such that the displacement of the above spherical mass part becomes zero, and feeds this back to the above control DC voltage.

In the accelerometer of this invention, the above displacement detection AC voltage comprises AC voltage components having three mutually different displacement detection frequencies, corresponding to linear displacements in the three axis directions of the above spherical mass part. If the above displacement detection AC voltage applied to the above first electrostatic supporting electrode is $AC_{X1}$, the above displacement detection AC voltage applied to the second electrostatic supporting electrode is $AC_{XS}$, the above displacement detection AC voltage applied to the third electrostatic supporting electrode is $AC_{Y1}$, the above displacement detection AC voltage applied to the fourth electrostatic supporting electrode is $AC_{Y2}$, the above displacement detection AC voltage applied to the fifth electrostatic supporting electrode is $AC_{Z1}$, and the above displacement detection AC voltage applied to the sixth electrostatic supporting electrode is $AC_{Z2}$, then these are expressed by the following expressions.

$$AC_{X1} = -E_X = E_0 \cos(\omega_1 t + \zeta_1)$$

$$AC_{X2} = -E_X = E_0 \cos(\omega_1 t + \eta_1)$$

$$AC_{y1} = -E_y = E_0 \cos(\omega_2 t + \zeta_1)$$

$$AC_{y2} = -E_y = E_0 \cos(\omega_3 t + \zeta_1)$$

$$AC_{z1} = -E_z = E_0 \cos(\omega_1 t + \zeta_1)$$

$$AC_{z2} = -E_z = E_0 \cos(\omega_1 t + \eta_1)$$

Here $\omega_1$, $\omega_2$ and $\omega_3$ are displacement detection frequencies, and $\zeta_1$, $\eta_1$, $\zeta_2$, $\zeta_3$, $\eta_3$ are phase differences, which are related as follows.

$$\eta_1 = \zeta_1 \pm 180°$$

$$\eta_2 = \zeta_2 \pm 180°$$

$$\eta_3 = \zeta_3 \pm 180°$$

In the accelerometer of this invention, each of the above electrostatic supporting electrodes contains one pair of electrode parts; the above control DC voltages applied to this pair of electrode parts are of the same magnitude, but opposite polarity. The above control operation part has a displacement operation part which operates the displacement of the above spherical mass part, a PID operation part which operates the force to be applied to the above spherical mass part, and a control voltage operation part which operates the correction amount of the above control DC voltage. The above acceleration output operation part is configured to input the output signal of the above PID operation part and operates the acceleration output. The above spherical mass part comprises either single-crystal or polycrystalline silicon.

The spherical sensor-type measurement device of this invention has a spherical mass part which functions as an inertial force sensor; a spherical shell-shape enclosure part which surrounds the above spherical mass part; a displacement detection device which detects displacements of the above spherical mass part; and electrodes positioned in the above enclosure part, and having spherical-shape inner surfaces.

In the spherical sensor-type measurement device of this invention, the above spherical mass part levitates by means of an electrostatic supporting force or magnetic force, and is configured such that a thin gap is formed between the spherical mass part and the above electrodes. The above electrodes include a plurality of electrostatic supporting electrodes, positioned symmetrically with respect to the above spherical mass part.

BRIEF DESCRIPTION OF THE DRAWINGS

FIG. 1 is a schematic view of an example of an accelerometer of this invention;

BEST MODE FOR CARRYING OUT THE INVENTION

Figure 2:
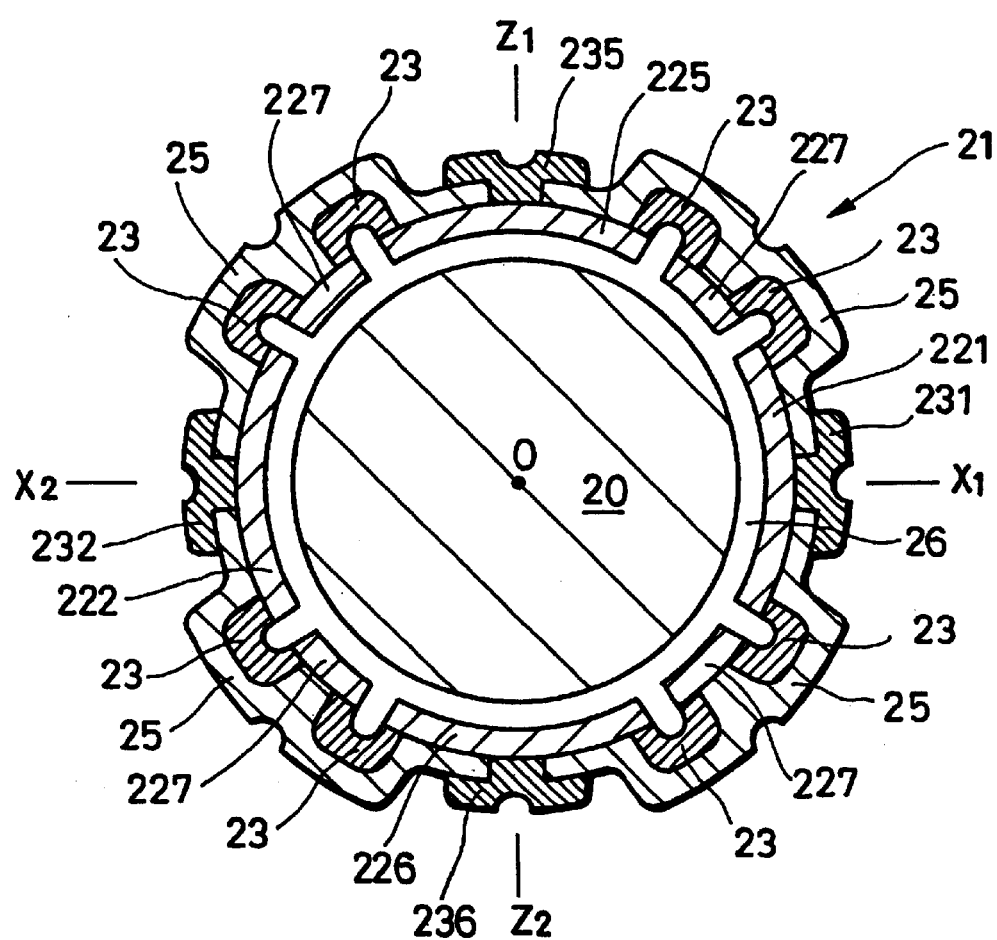
FIG. 2 is an explanatory diagram showing the configuration of an accelerometer of this invention.

An example of a buoyant spherical sensor-type accelerometer of this invention is explained below, referring to FIG. 1. The accelerometer of this example has a spherical mass part 20, and surrounding and positioned in proximity to the latter part, a plurality of electrodes. In this example, the electrodes have a spherical inner surface. Hence when the spherical mass part 20 is levitating, the gap between the spherical mass part 20 and the electrodes is fixed. As shown in the figure, the origin O is set at the center of the spherical mass part 20, and the $X_1$–$X_2$ axis and $Y_1$–$Y_2$ axis are set in the horizontal plane. The $Z_1$–$Z_2$ axis is set in the vertical direction.

In this example, electrodes include the first and second electrostatic supporting electrodes 221 (221A, 221B) and 222 (222A, 222B) positioned along the $X_1$–$X_2$ axis; the third and fourth electrostatic supporting electrodes 223 (223A, 223B) and 224 (224A, 224B) positioned along the $Y_1$–$Y_2$ axis; the fifth and sixth electrostatic supporting electrodes 225 (225A, 225B) and 226 (226A, 226B) positioned along the $Z_1$–$Z_2$ axis; and the displacement detection electrode 227 positioned between these electrostatic supporting electrodes.

As shown in the figure, each of the electrostatic supporting electrodes 221 to 226 comprises a pair of electrode parts 221A and 221B, 222A and 222B, 223A and 223B, 224A and 224B, 225A and 225B, and 226A and 226B. In this example, the electrostatic supporting electrodes are circular, and each electrode part has a semicircular shape.

The displacement detection electrode 227 is formed so as to occupy the portion remaining from the electrostatic supporting electrodes 221 to 226, and comprises a single electrode part.

The construction of the accelerometer of this example is here explained in greater detail, referring to FIG. 2. The accelerometer of this invention comprises a spherical mass part 20 and a casing 21 surrounding the latter. On the spherical inner surface of the casing 21 are formed six electrostatic supporting electrodes 221, 222, 223, 224, 225, 226 (in FIG. 2, only the electrodes 221, 222, 225, 226 are shown), and the displacement detection electrode 227. These electrodes 221 to 226 and 227 are divided by narrow grooves, but are mutually connected by a bridge 23 provided on the outer face, and form an integral structure.

When the spherical mass part 20 is levitated by the electrostatic supporting force, a thin, spherical shell-shape gap 26 is formed around the spherical mass part 20. This gap 26 is an enclosed space, and may be in vacuum, but may also be filled with an appropriate inert gas. The diameter of the spherical mass part 20 is several millimeters or less, and the thickness of this gap 26 may be several microns.

The spherical mass part 20 is formed of conductive material. As this conductive material, for example, single-crystal or polycrystalline silicon may be used. However, it is preferable that single-crystal or polycrystalline silicon be used. By using a single-crystal material, it is possible to provide a highly accurate spherical mass part which is not greatly influenced by thermal deformation, aging or the like.

The seven electrodes 221 to 226 and 227 are formed from a conductive material, and the bridge 230 is formed from an insulating material. An insulating protective film 25 is formed on the outer surface of the casing 21. Each of these electrodes 221 to 226 and 227 is connected to a terminal 231 to 236 and 237 (FIG. 3B). Each of these terminals 231 to 236 and 237 is explained below.

Figure 3A:
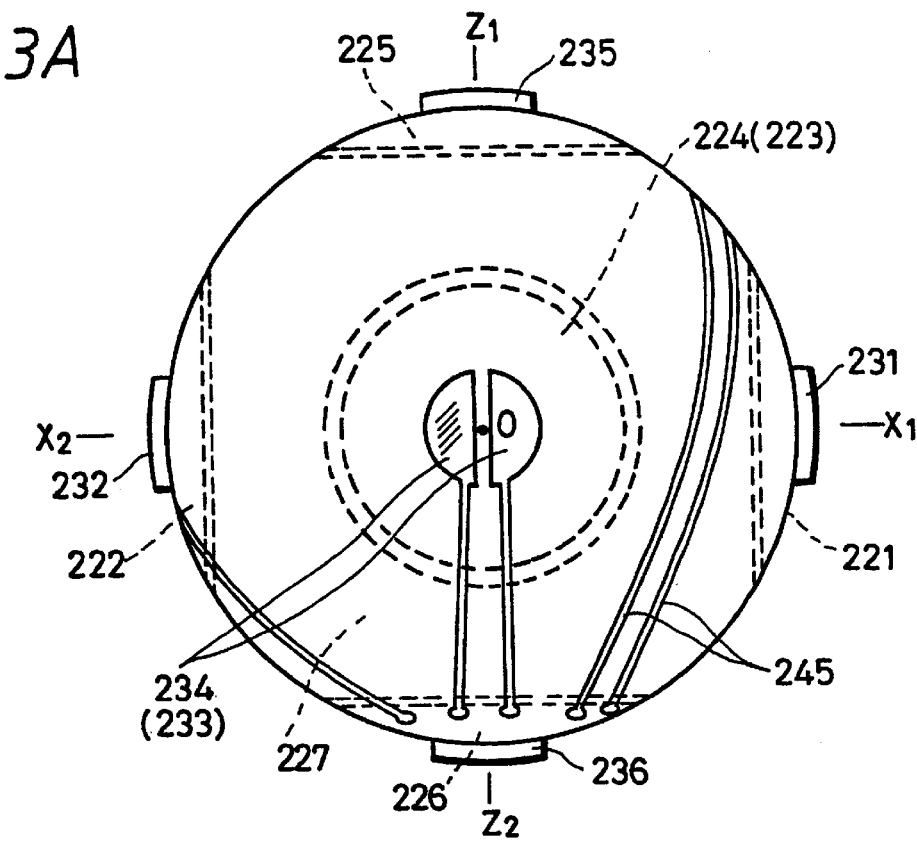
FIG. 3 is an explanatory diagram showing the electrodes and electrical wiring pattern of an accelerometer of this invention.
Figure 3B:
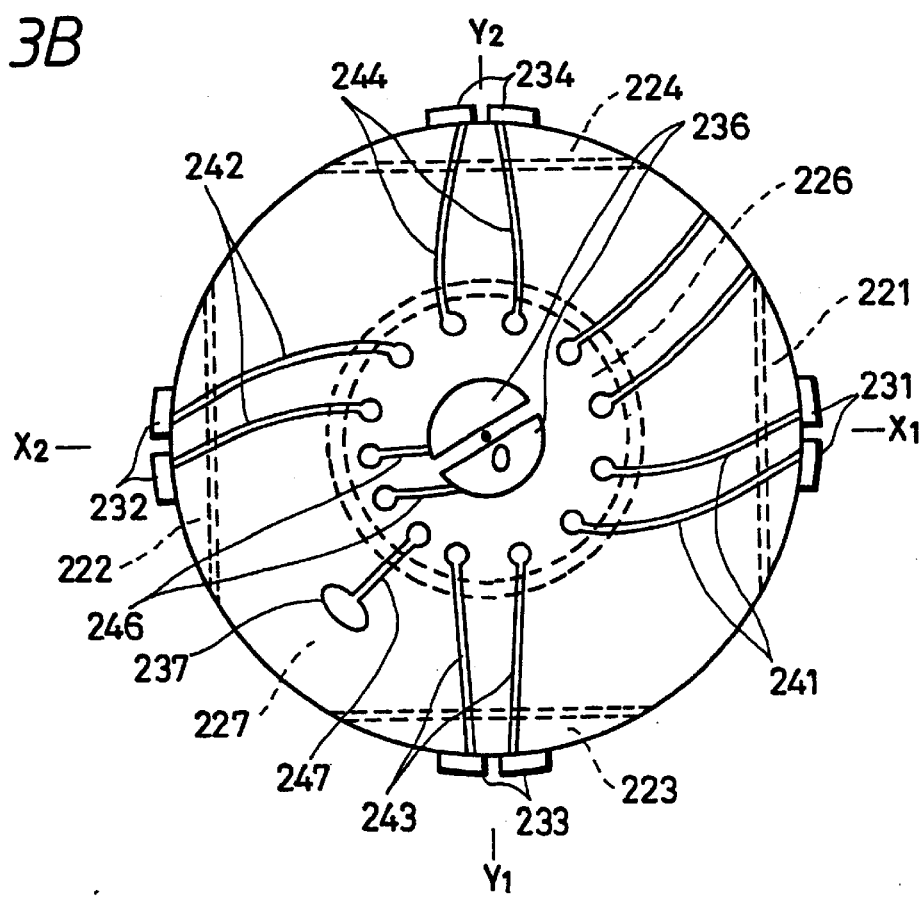

This is explained referring to FIG. 3. FIG. 3A is an external view of the accelerometer, seen along the $Y_1$ axis direction; FIG. 3B is an external view of the accelerometer, seen along the $Z_2$ axis direction. Terminals 231 to 236 and 237 are placed at positions corresponding to the electrodes 221 to 226 and 227, and each of the electrodes is electrically connected to the corresponding terminal. The electrical wiring patterns 241 to 246 (FIG. 3A) and 237 (FIG. 3B) extend from these terminals 231 to 236 and 237.

As explained above, each of the six electrodes 221 to 226 comprises a pair of electrode parts; hence each of the terminals 231 to 236 connected to the electrodes 221 to 226 comprises a pair of terminals. The electrical wiring pattern extending from these terminals comprises two lines for each electrode. On the other hand, there is a single terminal 237 connected to the displacement detection electrode 227, and a single electrical wiring pattern 247 extends therefrom.

As shown in FIG. 3B, the tip parts of these electrical wiring patterns 241 to 246 and 247 are concentrated in the lower side of the outer surface of the casing 21. The tip parts of the electrical wiring patterns 241 to 246 and 247 are, for example, arranged along the same circle, as shown in the figure. In this way, the six electrodes 221 to 226 and the displacement detection electrode 227 can be connected to an external device (not shown) having electrode terminal parts similarly arranged along the same circle.

Figure 4:
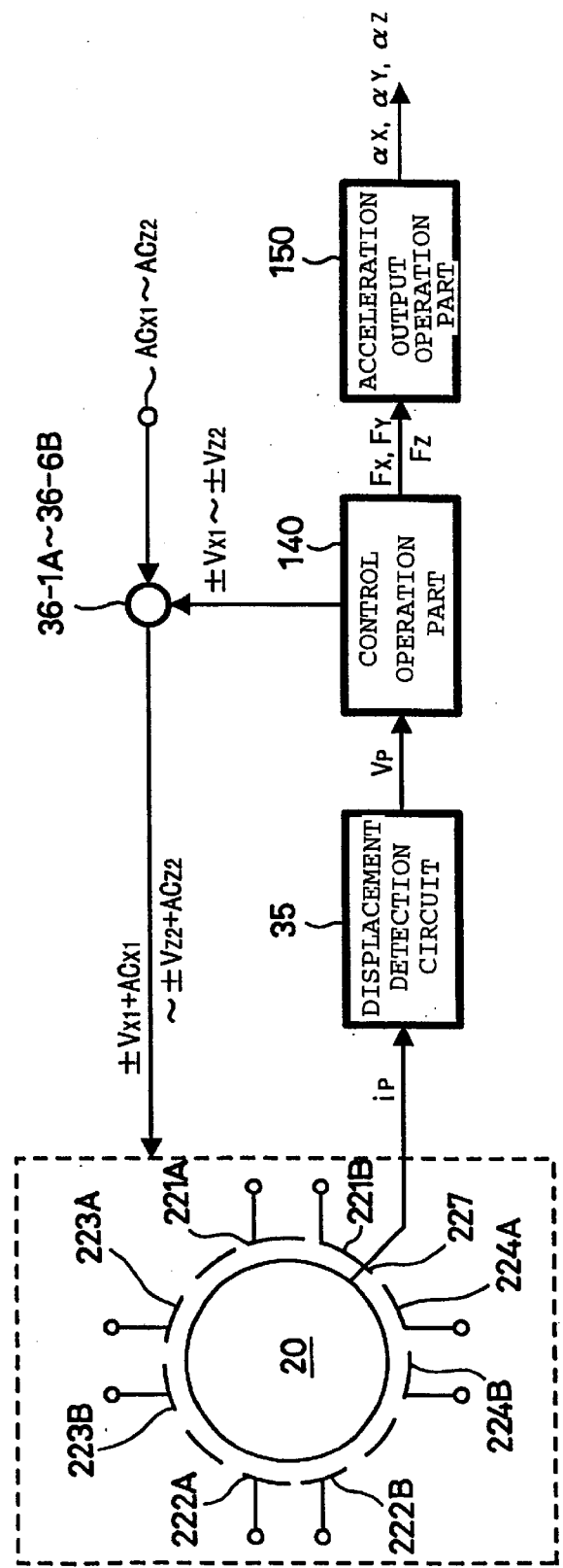
FIG. 4 is a diagram showing an example of a control loop for an accelerometer of this invention.

FIG. 4 shows an example of the control system of an accelerometer of this invention. The control system of this example is an active-type control system having a feedback loop, and has a displacement detection circuit which detects the displacement detection current $i_p$ and converts this into a displacement detection voltage $V_p$, that is, a preamp 35; a control operation part 140 which inputs the displacement detection voltage $V_p$ and generates control DC voltages $\pm V_{X1}$ to $\pm V_{Z2}$; and an acceleration output operation part 150 which inputs the output signal of the control operation part 140. The preamp 35 may be configured to, for example, include a resistance and a field-effect transistor.

The control DC voltages $\pm V_{X1}$ to $\pm V_{Z2}$ output by the control operation part 140 are added to the displacement detection AC voltages $AC_{X1}$ to $AC_{Z2}$ by the adders 36-1A to 36-6B respectively, and are supplied to the electrostatic supporting electrodes 221 to 226.

By applying the control DC voltages $\pm V_{X1}$ to $\pm V_{Z2}$ to the electrostatic supporting electrodes 221 to 226, the spherical mass part 20 is buoyantly supported and restrained to a prescribed reference position. Upon applying the superpositioned displacement detection AC voltages $AC_{X1}$ to $AC_{Z2}$ to the electrostatic supporting electrodes 221 to 226, a displacement detection current $i_p$ flows in the displacement detection electrode 227. This displacement detection current $i_p$ is converted into a voltage signal $V_p$ by the preamp 35. The voltage signal $V_p$ comprises all the linear displacement information for the spherical mass part 20.

The voltage signal $V_p$ is supplied to the control operation part 140. The displacements of the spherical mass part in the X-axis direction $\pm \Delta X$, in the Y-axis direction $\pm \Delta Y$, and in the Z-axis direction $\pm \Delta Z$, are detected by the control operation part 140. From the displacements, the control DC voltages $\pm V_{X1}$ to $\pm V_{Z2}$ to be applied to the electrostatic supporting electrodes 221 to 226 are operated. In this way, the control DC voltages $\pm V_{X1}$ to $\pm V_{Z2}$ change, and the spherical mass part 20 is returned to its original position such that the deviation amount becomes zero.

The control loop of this example is configured as an active-type control loop, such that the deviation amount of the spherical mass part 20 is actually measured, and the electrostatic force is actively changed such that this deviation amount becomes zero.

Figure 5:
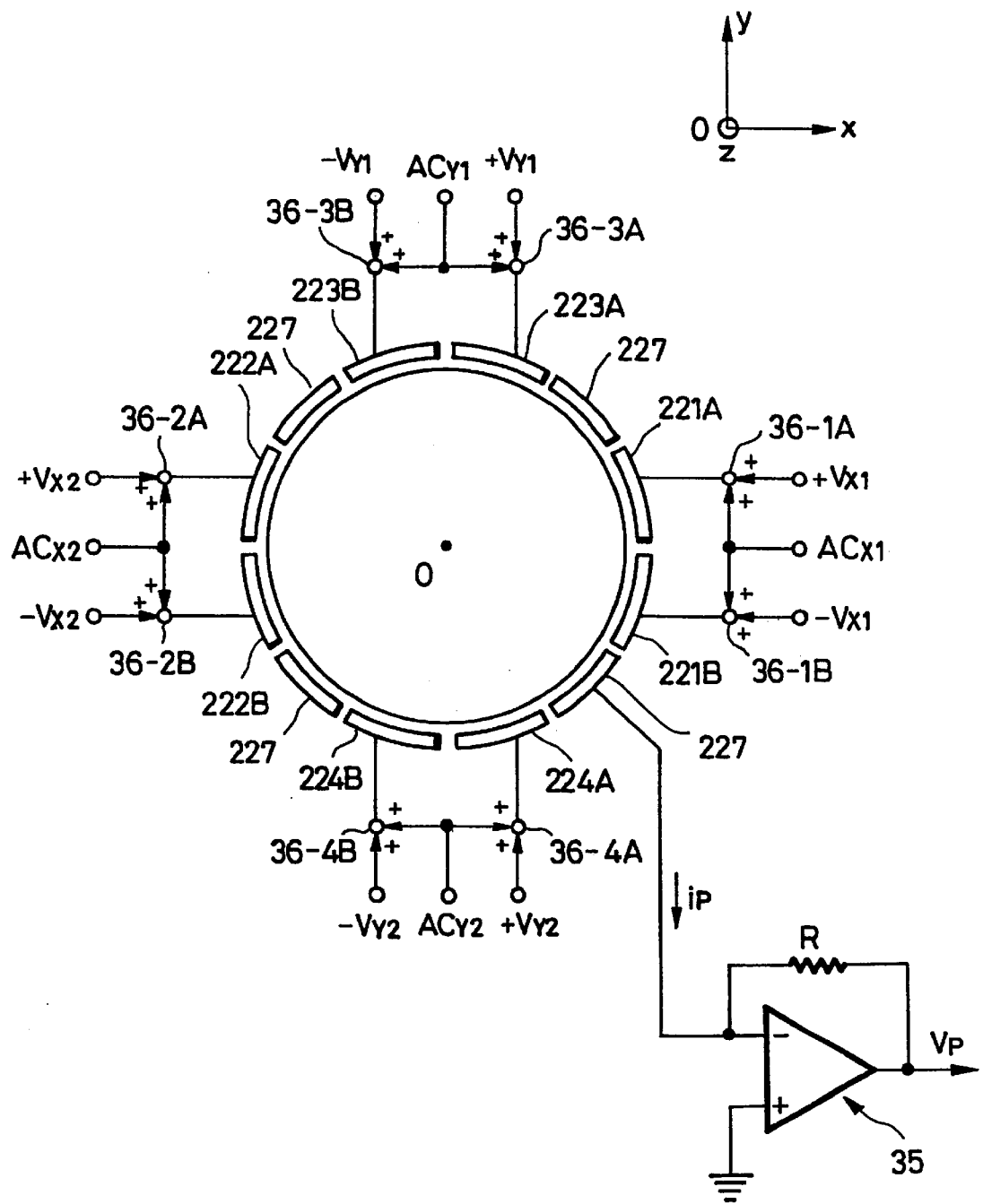
FIG. 5 is an explanatory diagram which explains the voltage signals applied to the electrodes of an accelerometer of this invention.

Next, the voltage signal supplied to the electrostatic supporting electrodes 221 to 226 is explained, referring to FIG. 5. In FIG. 5, a cross-sectional slice along the XY plane of the accelerometer of this invention is shown; the first and second electrostatic supporting electrodes 221 (221A, 221B) and 222 (222A, 222B) are positioned along the X-axis, and the third and fourth electrostatic supporting electrodes 223 (223A, 223B) and 224 (224A, 224B) are positioned along the Y-axis. Though not shown in the figure, the fifth and sixth electrostatic supporting electrodes 225 (225A, 225B) and 226 (226A, 226B) are similarly positioned along the Z-axis.

First, application of the control DC voltage is explained. The DC voltage $+V_{X1}$ is applied to the electrode part 221A of the first electrostatic supporting electrode 221 via the adder 36-1A, and the DC voltage $-V_{X1}$ is applied to the second electrode part 221B via the adder 36-1B. Similarly, the DC voltages $+V_{X2}$, $-V_{X2}$ are applied to the electrode parts 222A, 222B of the second electrostatic supporting electrode 222 via the adders 36-2A, 36-2B.

The DC voltages $+V_{Y1}$, $-V_{Y1}$ are applied to the electrode parts 223A, 223B of the third electrostatic supporting electrode 223 via the adders 36-3A, 36-3B respectively, and the DC voltages $+V_{Y2}$, $-V_{Y2}$ are applied to the electrode parts 224A, 224B of the fourth electrostatic supporting electrode 224 via the adders 36-4A, 36-4B respectively.

Though not shown, DC voltages $+V_{Z1}$, $-V_{Z1}$ are similarly applied to the electrode parts 225A, 225B of the fifth electrostatic supporting electrode 225 via the adders 36-5A, 36-5B respectively, and the DC voltages $+V_{Z2}$, $-V_{Z2}$ are applied to the electrode parts 226A, 226B of the sixth electrostatic supporting electrode 226 via the adders 36-6A, 36-6B, respectively.

Next, application of the displacement detection AC voltage is explained. The detection AC voltage $AC_{X1}$ is applied to each of the electrode parts 221A, 221B of the first electrostatic supporting electrode 221 via the adders 36-1A, 36-1B, and the detection AC voltage $AC_{X2}$ is applied to the electrode parts 222A, 222B of the second electrostatic supporting electrode 222 via the adders 36-2A, 36-2B respectively. The detection AC voltage $AC_{Y1}$ is applied to each of the electrode parts 223A, 223B of the third electrostatic supporting electrode 223 via the adders 36-3A, 36-3B, and the detection AC voltage $AC_{Y2}$ is applied to the electrode parts 224A, 224B of the fourth electrostatic supporting electrode 224 via the adders 36-4A, 36-4B respectively.

Though not shown, the detection AC voltages $AC_{Z1}$, $AC_{Z2}$ are applied to each of the electrode parts 225A, 225B and 226A, 226B of the fifth and sixth electrostatic supporting electrodes 225, 226 via the adders 36-5A, 36-5B and 36-6A, 36-6B, respectively. These detection AC voltages $AC_{X1}$, $AC_{X2}$, $AC_{Y1}$, $AC_{Y2}$, $AC_{Z1}$, $AC_{Z2}$ are expressed as follows.

$$AC_{X1} = -E_X = E_0 \cos(\omega_1 t + \zeta_1)$$
$$AC_{X2} = +E_X = E_0 \cos(\omega_1 t + \eta_1)$$
$$AC_{Y1} = -E_Y = E_0 \cos(\omega_2 t + \zeta_2)$$
$$AC_{Y2} = +E_Y = E_0 \cos(\omega_2 t + \eta_2)$$
$$AC_{Z1} = -E_Z = E_0 \cos(\omega_3 t + \zeta_3)$$
$$AC_{Z2} = +E_Z = E_0 \cos(\omega_3 t + \eta_3) \quad \text{[expressions 1]}$$

Here $\pm E_X$ is the voltage component used to detect a linear displacement $\Delta X$ of the spherical mass part 20 in the X-axis direction; $\pm E_Y$ is the voltage component used to detect a linear displacement $\Delta Y$ of the spherical mass part 20 in the Y-axis direction; and $\pm E_Z$ is the voltage component used to detect a linear displacement $\Delta Z$ of the spherical mass part 20 in the Z-axis direction. $\omega_1$, $\omega_2$ and $\omega_3$ are frequencies used for displacement detection. The signs of $\pm E_X$, $\pm E_Y$ and $\pm E_Z$ indicate that phases are different by 180°. Hence there are the following relations between the phase differences $\zeta$ and $\eta$.

$$\eta_1 = \zeta_1 \pm 180$$
$$\eta_2 = \zeta_2 \pm 180$$
$$\eta_3 = \zeta_3 \pm 180 \quad \text{[expressions 2]}$$

Figure 6:
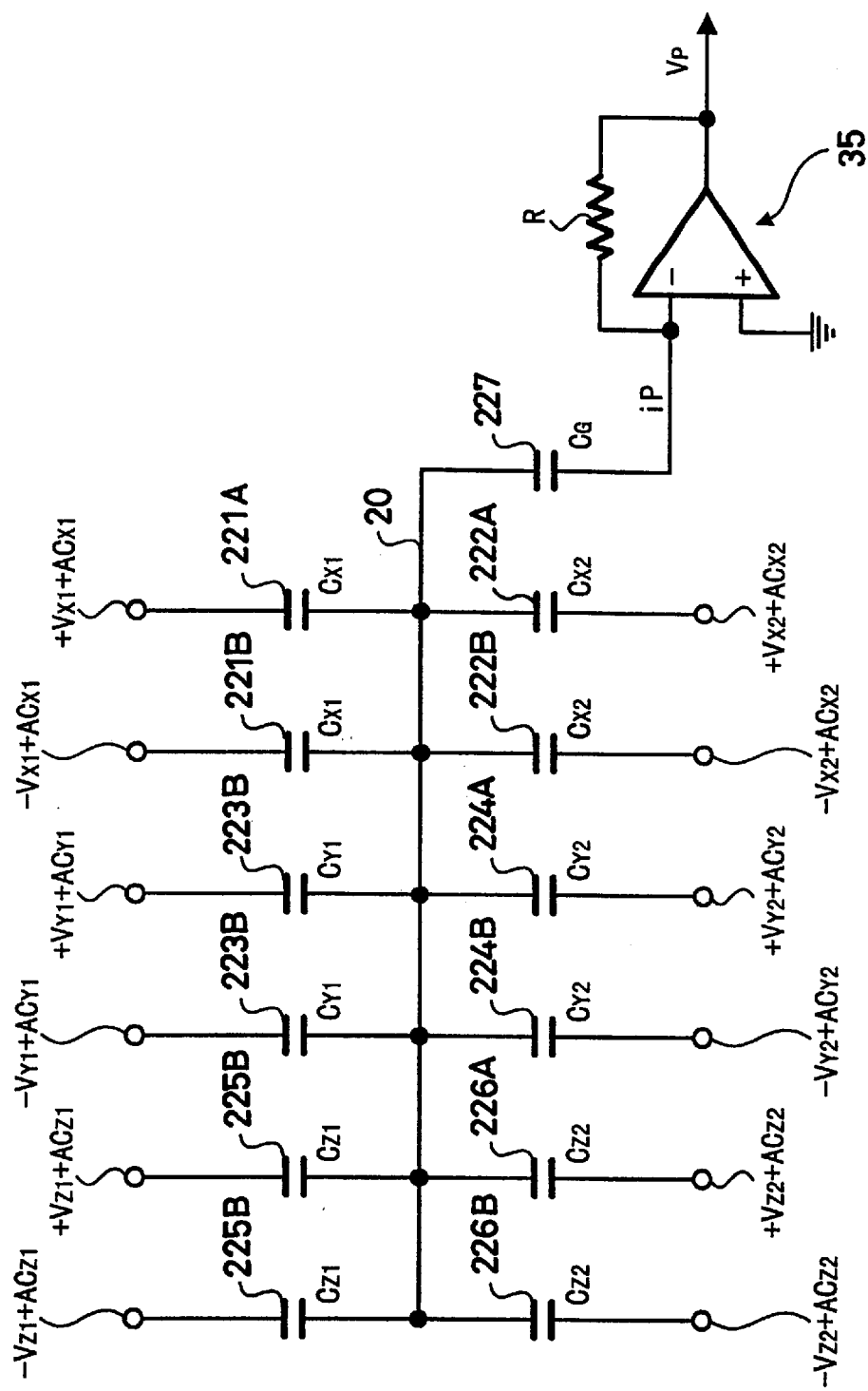
FIG. 6 is a diagram showing the equivalent circuit of the control system of an accelerometer of this invention.

The principle of the displacement detection system of this example is here explained, referring to FIG. 6. FIG. 6 shows the equivalent circuit of the control system of FIG. 5. In this equivalent circuit, the first through sixth electrostatic supporting electrodes 221, 222, 223, 224, 225 and 226, the displacement detection electrode 227, and the corresponding spherical mass part 20 are replaced by capacitors. The electrostatic capacitance between the first electrode part 221A of the first electrostatic supporting electrode 221 and the spherical mass part 20, and the electrostatic capacitance between the second electrode part 221B and the spherical mass part 20, are equal and are $C_{x1}$; and the electrostatic capacitance between the first electrode part 222A of the second electrostatic supporting electrode 222 and the spherical mass part 20, and the electrostatic capacitance between the second electrode part 222B and the spherical mass part 20, are equal and are $C_{x2}$.

Similarly, the electrostatic capacitance between the electrode parts 223A, 223B of the third electrostatic supporting electrode 223 and the spherical mass part 20 is $C_{y1}$, and the electrostatic capacitance between the electrode parts 224A, 224B of the fourth electrostatic supporting electrode 224 and the spherical mass part 20 is $C_{y2}$. And, the electrostatic capacitance between the electrode parts 225A, 225B of the fifth electrostatic supporting electrode 225 and the spherical mass part 20 is $C_{z1}$, and the electrostatic capacitance between the electrode parts 226A, 226B of the sixth electrostatic supporting electrode 226 and the spherical mass part 20 is $C_{z2}$.

Let the electrostatic capacitance of the capacitor formed by the displacement detection electrode 227 and the spherical mass part 20 be $C_G$.

For example, suppose that the spherical mass part 20 is displaced linearly by $\Delta X$ in the X-axis direction, is linearly displaced by $\Delta Y$ in the Y-axis direction, and is linearly displaced by $\Delta Z$ in the Z-axis direction. If it is assumed that these displacements are small, then the electrostatic capacitances of each capacitor are expressed as follows.

$$C_{X1} = C_0(1+\Delta X)/2$$
$$C_{X2} = C_0(1-\Delta X)/2$$
$$C_{Y1} = C_0(1+\Delta Y)/2$$
$$C_{Y2} = C_0(1-\Delta Y)/2$$
$$C_{Z1} = C_0(1+\Delta Z)/2$$
$$C_{Z2} = C_0(1-\Delta Z)/2 \quad \text{[expressions 3]}$$

Here $C_0$ is the electrostatic capacitance of one set of capacitors when all displacements are zero. Conversely, these expressions can be used to express the displacements $\Delta X$, $\Delta Y$, $\Delta Z$ in terms of the capacitances of these capacitors.

$$\Delta X = (1/C_0)(C_{X1} - C_{X2})$$
$$\Delta Y = (1/C_0)(C_{Y1} - C_{Y2})$$
$$\Delta Z = (1/C_0)(C_{Z1} - C_{Z2}) \quad \text{[expressions 4]}$$

In this example, control DC voltages of equal magnitude but opposite polarity, $\pm V_{X1}$, $\pm V_{X2}$, $\pm V_{Y1}$, $\pm V_{Y2}$, $\pm V_{Z1}$, $\pm V_{Z2}$, are applied to the pairs of electrode parts comprising each of the electrostatic supporting electrodes, that is, 221A and 221B, 222A and 222B, 223A and 223B, 224A and 224B, 225A and 225B, and 226. and 226B. Hence the potential at the midpoint of two neighboring capacitors is zero. Thus in this example, control DC voltages of equal magnitude but opposite polarities are applied to each pair of electrode parts of the electrostatic supporting electrodes, so that the potential of the spherical mass part 20 becomes zero.

When detection AC voltages $AC_{X1}$, $AC_{X2}$, $AC_{Y1}$, $AC_{Y2}$, $AC_{Z1}$, $AC_{Z2}$ are applied, superpositioned with the control DC voltage, to the first through sixth electrostatic supporting electrodes 221, 222, 223, 224, 225, 226 respectively, a displacement detection AC current $i_p$ occurs in the displacement detection capacitor. This displacement detection AC current $i_p$ is expressed as follows.

$$i_p = K_I(C_{X1}AC_{X1} + C_{X2}AC_{X2} + C_{Y1}AC_{Y1} + C_{Y2}AC_{Y2} + C_{Z1}AC_{Z1} + C_{Z2}AC_{Z2})$$
$$K_I = 2C_G s/(2C_{x1} + 2C_{x2} + 2C_{Y1} + 2C_{Y2} + 2C_{Z1} + 2C_{Z2} + C_G) \quad \text{[expressions 5]}$$

Here $K_I$ is a proportionality constant, and s is the Laplace operator. Substituting into the right-hand side of this expression the displacement detection AC voltage expressed by ex. (1) and the electrostatic capacitance expressed by ex. (3), and rearranging, the displacement detection AC current $i_p$ is expressed as follows.

$$i_p = K_p(E_X \Delta X + E_Y \Delta Y + E_Z \Delta Z)$$
$$K_p = -2C_0 C_G s/(6C_0 + C_G) \quad \text{[expressions 6]}$$

$K_p$ is called the pickup coefficient. The displacement detection AC current $i_p$ is supplied to the pre!amp 35 and converted into a displacement detection AC voltage $V_p$. This displacement detection AC voltage $V_p$ is expressed by the following expression.

$$V_P = V_P(X) + V_P(Y) + V_P(Z) \quad \text{[expression 7]}$$

Here the terms on the right side are voltage components corresponding to each of the displacements $\Delta X$, $\Delta Y$, $\Delta Z$, expressed as follows.

$$V_p(X) = K_p E_x \Delta X = K_{V1} E_0 \omega_1 \Delta X \cdot \sin(\omega_1 t + \zeta_1)$$

$$V_p(y) = K_p E_y \Delta Y = K_{V2} E_0 \omega_2 \Delta Y \cdot \sin(\omega_2 t + \zeta_2)$$

$$V_p(Z) = K_p E_z \Delta Z = K_{V3} E_0 \omega_3 \Delta Z \cdot \sin(\omega_3 t + \zeta_3) \quad \text{[expressions 8]}$$

Here $K_{v1}$ to $K_{v3}$ are constants determined by the electrostatic capacitances $C_0$, $C_G$ of the capacitors. As is clear from ex. 6 and ex. 7, the output voltage VP comprises independent linear displacements for the three axial directions of the spherical mass part 20. Hence if a required voltage component is extracted from ex. (7), the corresponding displacement can be obtained For example, of the linear displacements $\Delta X$, $\Delta Y$, $\Delta Z$, even when two or more displacements are superposed, by extracting the corresponding voltage component, a displacement can be obtained. This expression indicates that the output voltage $V_p$ is amplitude-modulated by each of the displacement detection frequencies $\omega_1$, $\omega_2$, $\omega_3$ corresponding to the linear displacements $\Delta X$, $\Delta Y$, $\Delta Z$.

Figure 7:
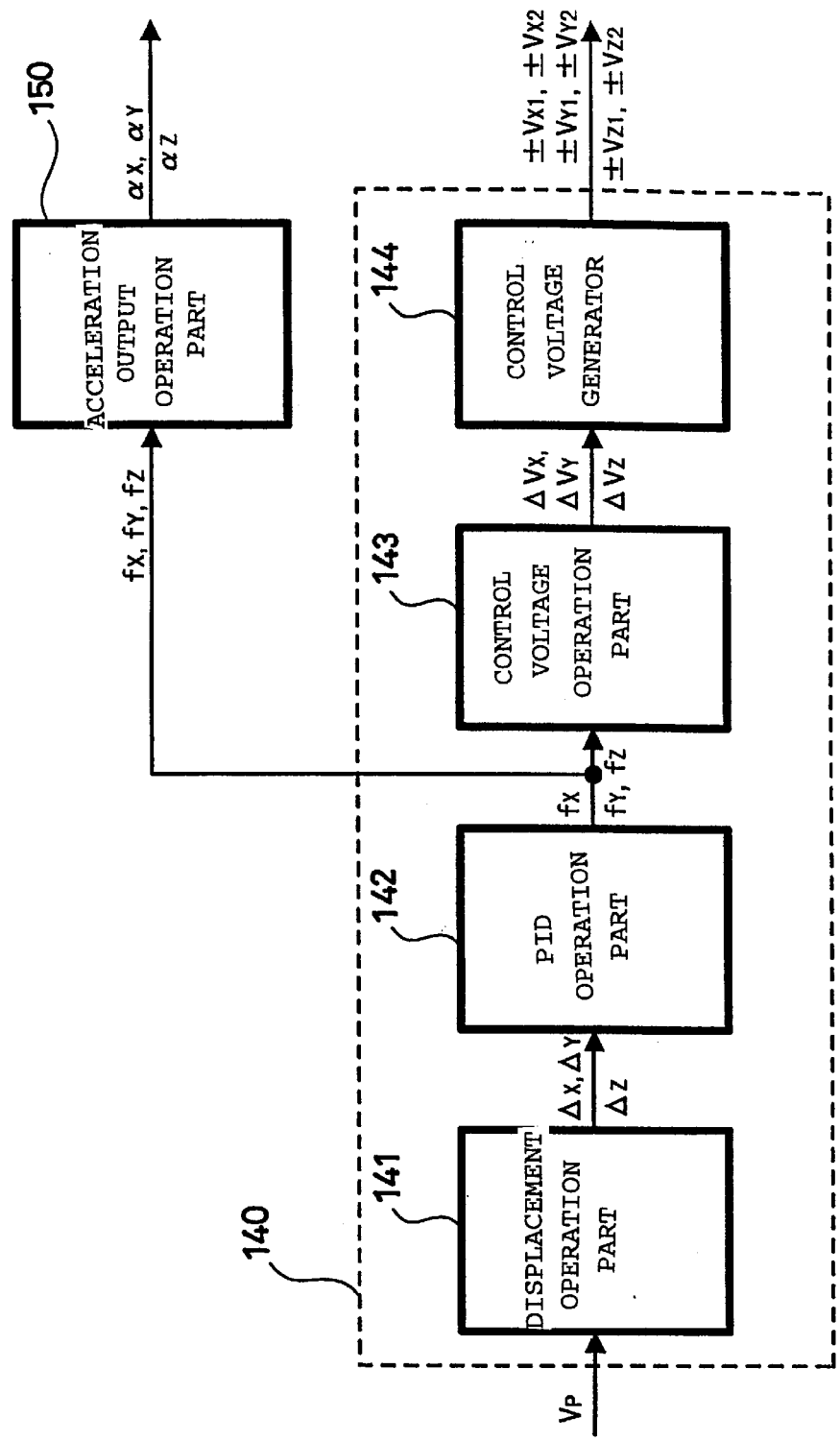
FIG. 7 is a diagram showing an example of the configuration of the control operation part, and an example of the acceleration output operation part, of an accelerometer of this invention.

FIG. 7 shows the configuration of the control operation part 140 and acceleration output operation part 150 of the accelerometer of this invention. The control operation part 140 of this example has a displacement operation part 141 which inputs the output voltage $V_p$ of the preamp 35 and operates the linear displacements $\Delta X$, $\Delta Y$, $\Delta Z$; a PID operation part 142 which operates the restraining forces $f_X$, $f_Y$, $f_Z$ to be applied to the spherical mass part 20 such that the displacement of the spherical mass part 20 becomes zero; a control voltage operation part 143 which operates the changes $\Delta V_X$, $\Delta V_Y$, $\Delta V_Z$ in the control DC voltage; and a control voltage generator 144 which generates the control DC voltages $V_{X1}$, $V_{X2}$, $V_{Y1}$, $V_{Y2}$, $V_{Z1}$, $V_{Z2}$. The acceleration output operation part 150 inputs the restraining forces $f_X$, $f_Y$, $f_Z$ output by the control operation part 140, and operates the acceleration outputs $\alpha_X$, $\alpha_Y$, $\alpha_Z$.

Figure 8:
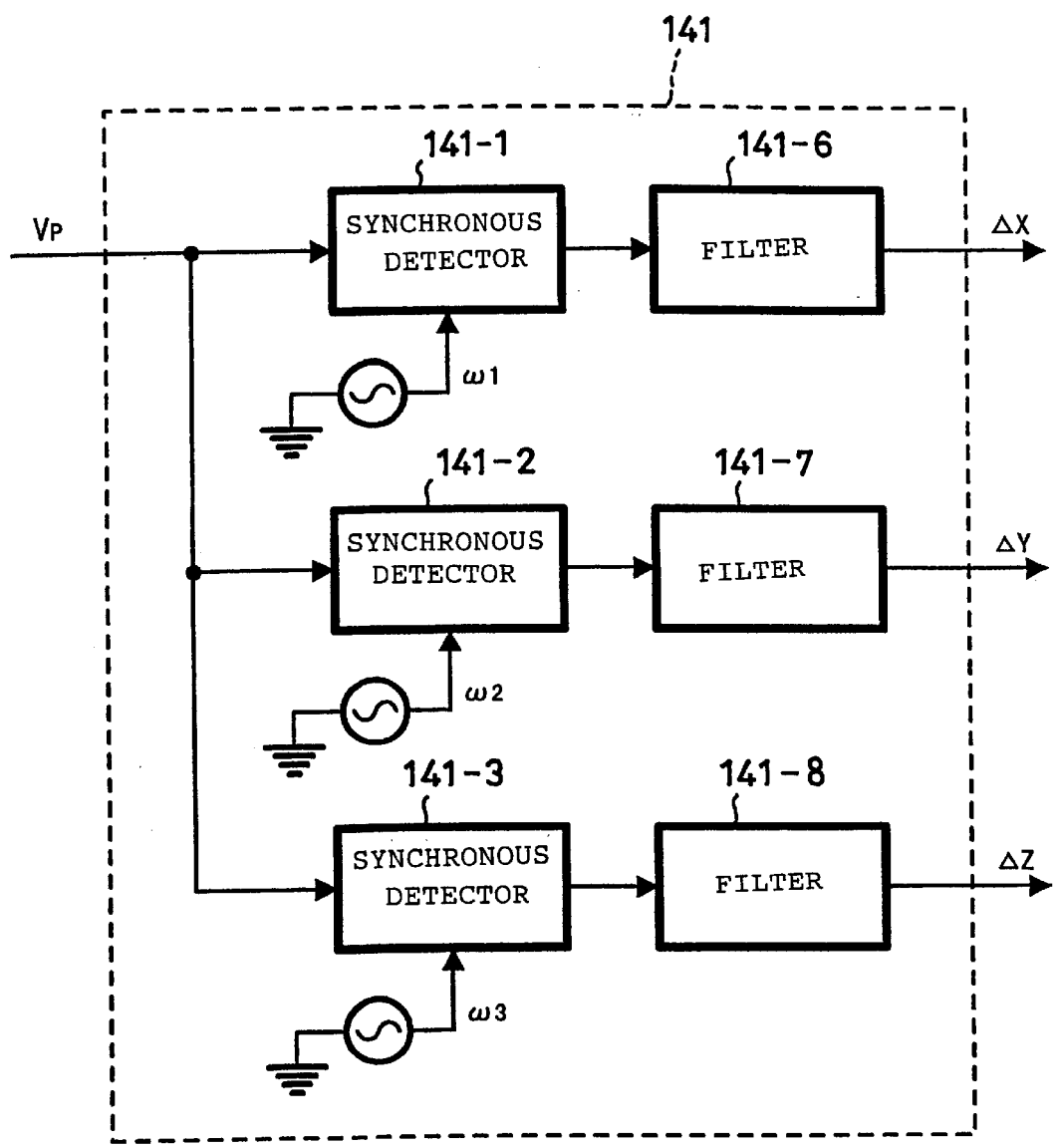
FIG. 8 is a diagram showing an example of the configuration of the displacement operation part of an accelerometer of this invention.

The configuration and operation of the displacement operation part 141 of this example are here explained, referring to FIG. 8. The displacement operation part 141 of this example comprises a first synchronization detector 141-1 which detects the synchronization of the voltage signal $V_p$ using a reference signal at frequency $\omega 1$ and determines the voltage component $V_p(X)$ of the first expression in ex. (8); a second synchronization detector 141-2 which detects the synchronization of the voltage signal $V_p$ using a reference signal at frequency $\omega 2$ and determines the voltage component $V_p(Y)$ of the second expression in ex. (8); and a third synchronization detector 141-3 which detects the synchronization of the voltage signal $V_p$ using a reference signal at frequency $\omega 3$ and determines the voltage component $V_p(Z)$ of the third expression in ex. (8).

On the output sides of each of these synchronization detectors 141-1, 141-2, 141-3 are provided filters 141-6, 141-7, 141-8 to rectify an AC waveform into a DC waveform.

As indicated by ex. (8), the output voltages of these filters represent the linear displacements $\Delta X$, $\Delta Y$, $\Delta Z$. These displacement signals are supplied to the PID operation part 142 and to the control voltage operation part 143.

Figure 9:
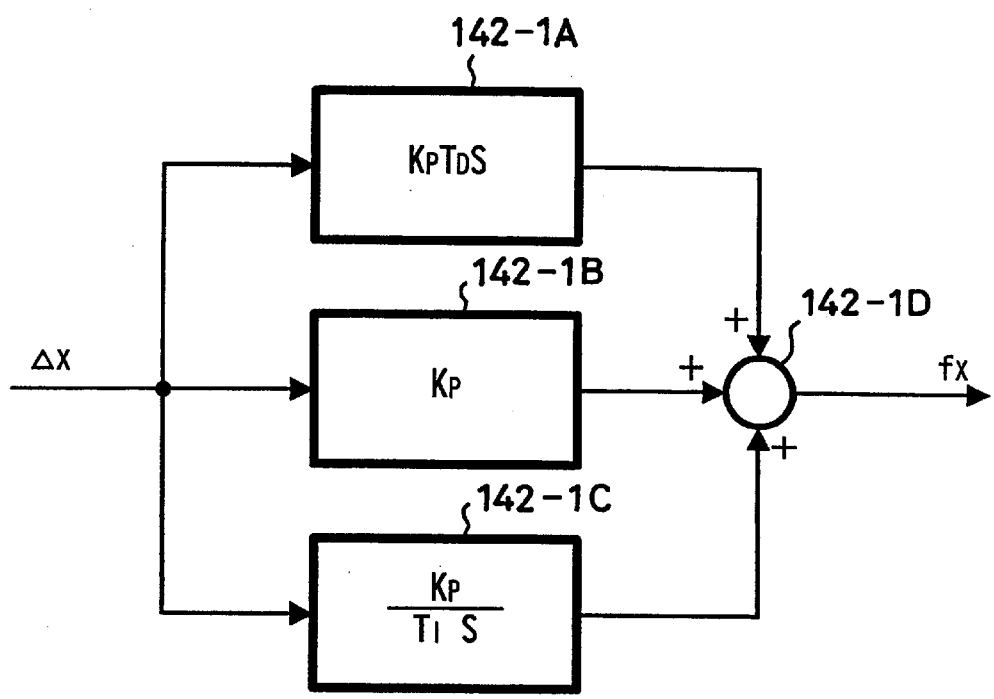
FIG. 9 is a diagram showing an example of the configuration of the PID operation part of an accelerometer of this invention.
Figure 10A:
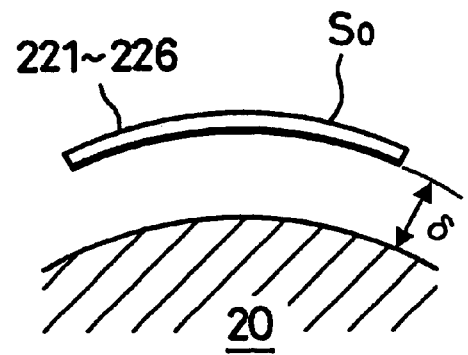
FIG. 10 is an explanatory diagram to explain an example of the operation of the control voltage operation part of an accelerometer of this invention.
Figure 10B:
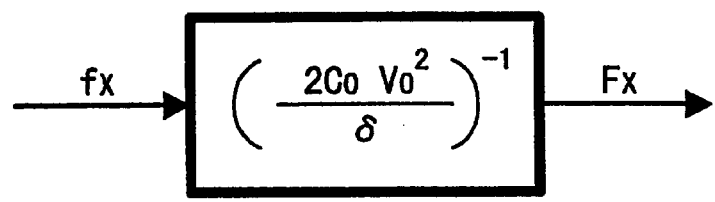
Figure 10B:
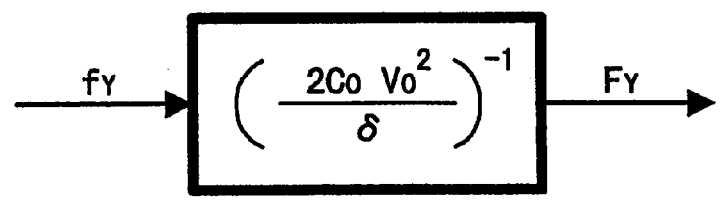
Figure 10B:
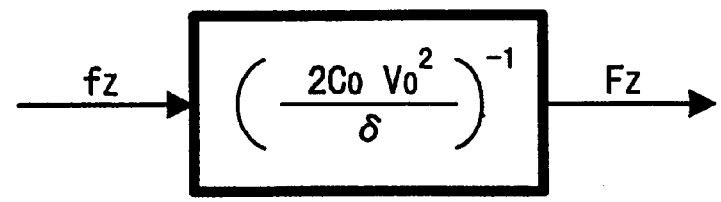

The configuration and operation of the PID operation part of this example are here explained, referring to FIG. 9. The PID operation part 142 of this example comprises three PID operators, 142-1, 142-2, 142-3; the PID operators each input a linear displacement $\Delta X$, $\Delta Y$, $\Delta Z$ and operate a restraining force $f_X$, $f_Y$, $f_Z$.

FIG. 9 shows the configuration of the first PID operator 142-1. The first PID operator 142-1 comprises a differentiating part 142-1A which inputs the linear displacement $\Delta X$ and performs differentiation; a proportional operation part 142-1B which operates proportionality; an integrating part 142-1C which performs integration; and an addition part 142-1D which adds these operation results. The output signal of the addition part 142-1D is the output signal of the PID operation part 142-1. In FIG. 9, S is the Laplace operator, $K_P$ is a proportionality constant, and $T_D$ and $T_I$ are a differentiation constant and an integration constant.

The configuration of the other two PID operators included in the PID operation part of this example, that is, the second and third PID operators 142-2 and 142-3, may be similar to the configuration of the first PID calculator 142-1 shown in FIG. 9. The output signals $f_X$, $f_Y$, $f_Z$ of the PID operation part 142 are supplied to the control voltage operation part 143.

The configuration and operation of the control voltage operation part 143 of this example are here explained, referring to FIG. 10. The control voltage operation part 143 first renders dimensionless the linear displacements $\Delta X$, $\Delta Y$, $\Delta Z$ and the restraining forces $f_X$, $f_Y$, $f_Z$ to be applied to the spherical mass part 20. As shown in FIG. 10A, the electrostatic supporting electrodes and the corresponding [area of the] spherical mass part 20 may be regarded as a type of capacitor. There is a gap, of thickness 6, between the electrostatic supporting electrodes and the spherical mass part 20; this area becomes a capacitor. In this example, the electrostatic supporting electrodes have spherical inner surfaces, so that the thickness 6 of the gap is constant. The following expressions are used to render the linear displacements $\Delta X$, $\Delta Y$, $\Delta Z$ dimensionless.

$$\Delta X_N = \Delta X/\delta$$

$$\Delta Y_N = \Delta Y/\delta$$

$$\Delta Z_N = \Delta Z/\delta \quad \text{[expressions 9]}$$

Here the subscript N indicates a dimensionless quantity. Next, the method used to render the restraining forces $f_X$, $f_Y$, $f_Z$ dimensionless is explained, referring to FIG. 10B. The restraining forces $F_X$, $F_Y$, $F_Z$ are made dimensionless using the following expressions.

$$F_X = f_x(2C_0V_0^2/\delta)^{-1}$$

$$F_Y = f_y(2C_0V_0^2/\delta)^{-1}$$

$$F_Z = f_z(2C_0V_0^2/\delta)^{-1} \quad \text{[expressions 10]}$$

$C_0$ is the electrostatic capacitance when the displacement of the spherical mass part 20 is zero, and is expressed using the capacitor area $S_0$ and the dielectric constant $\in$ by $C_0 \approx \in S_0/\delta$. $V_0$ is the reference voltage, that is, the control. DC voltage when the displacement of the spherical mass part 20 is zero. From the dimensionless restraining forces $F_X$, $F_Y$, $F_Z$, the changes $\Delta V_{X1}$, $\Delta V_{X2}$, $\Delta V_{Y1}$, $\Delta V_{Y2}$, $\Delta V_{Z1}$, $\Delta V_{Z2}$ in the control DC voltage are calculated.

The [pairs of] changes $\Delta V_{X1}$ and $\Delta V_{X2}$, $\Delta V_{Y1}$ and $\Delta V_{Y2}$, $\Delta V_{Z1}$ and $\Delta V_{Z2}$ in the control DC voltages $\pm V_{X1}$, $\Delta V_{X2}$, $\pm V_{Y1}$, $\Delta V_{Y2}$, $\pm V_{Z1}$, $\Delta V_{Z2}$ applied to each of the six electrostatic supporting electrodes 221, 222, 223, 224, 225, 226 are each equal, and are respectively equal to the dimensionless restraining forces $F_X$, $F_Y$, $F_Z$.

$$\Delta V_{X1} = \Delta V_{X2} = \Delta V_X = F_X$$

$$\Delta V_{Y1} = \Delta V_{Y2} = \Delta V_Y = F_Y$$

$$\Delta V_{Z1} = \Delta V_{Z2} = \Delta V_Z = F_Z \quad \text{[expressions 11]}$$

The control voltage generator 144 generates the control DC voltages $V_{X1}$ to $V_{Z2}$ supplied to the six electrostatic supporting electrodes 221, 222, 223, 224, 225, 226. These control DC voltages are expressed by the following expressions.

$$\Delta V_{X1} = V_0(1+\Delta V_X)$$
$$\Delta V_{X2} = V_0(1-\Delta V_X)$$
$$\Delta V_{Y1} = V_0(1+\Delta V_Y)$$
$$\Delta V_{Y2} = V_0(1-\Delta V_Y)$$
$$\Delta V_{Z1} = V_0(1+\Delta V_Z)$$
$$\Delta V_{Z2} = V_0(1-\Delta V_Z) \quad \text{[expressions 12]}$$

$V_0$ is the reference voltage. Next, the electrostatic force actually acting on the spherical mass part 20 is determined. The electrostatic forces acting on the spherical mass part 20 are proportional to the differences in the control DC voltages $V_{X1}$ and $V_{X2}$, $V_{Y1}$ and $V_{Y2}$, and $V_{Z1}$ and $V_{Z2}$ applied to the electrostatic supporting electrodes 221 and 222, 223 and 224, and 225 and 226 respectively, in each of the coordinate axis directions.

$$F_X = K_X(V_1 - V_{X2})$$
$$F_Y = K_Y(V_{Y1} - V_{Y2})$$
$$F_Z = K_Z(V_{Z1} - V_{Z2}) \quad \text{[expressions 13]}$$

$K_X$, $K_Y$, $K_Z$ are constants determined by the shape of the capacitors formed by the electrostatic supporting electrodes and the spherical mass part 20. Substituting ex. (12) into the right-hand side of each of these expressions, and also using eq. (11), it is clear that the electrostatic forces actually acting on the spherical mass part 20 are equal to the restraining forces to be applied to the spherical mass part 20.

Figure 11:
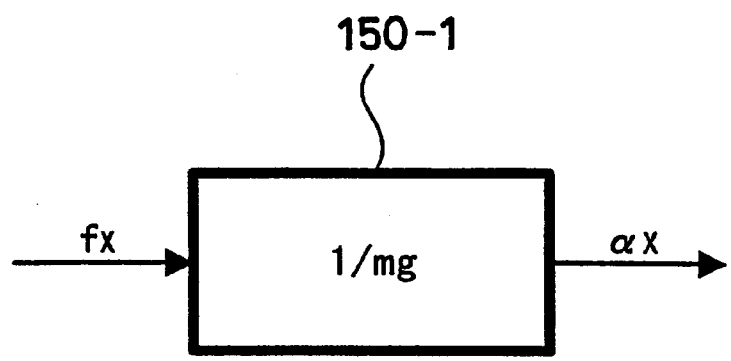
FIG. 11 is an explanatory diagram to explain an example of the operation of the acceleration output operation part of an accelerometer of this invention; and, FIG. 12 is a diagram showing another example of an accelerometer of this invention.
Figure 11:
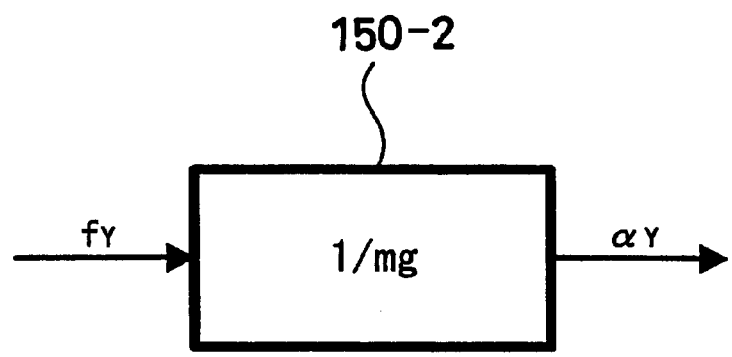
Figure 11:
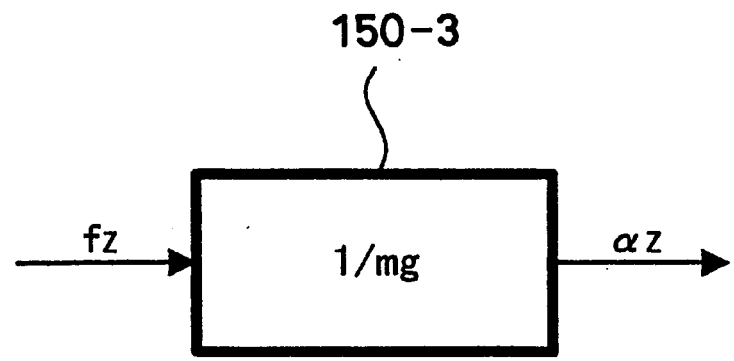

The configuration and operation of the acceleration output operation part 150 of this invention are here explained, referring to FIG. 11. The acceleration output operation part 150 of this invention has three multipliers, 150-1 to 150-3. These multipliers operate the external-force accelerations $\alpha_X$, $\alpha_Y$, $\alpha_Z$ from the restraining forces $f_X$, $f_Y$, $f_Z$ to be applied to the spherical mass part 20. The external-force accelerations are expressed as follows.

$$\alpha_X = f_X/mg$$
$$\alpha_Y = f_Y/mg$$
$$\alpha_Z = f_Z/mg \quad \text{[expressions 14]}$$

Here m is the mass of the spherical. mass part 20, and g is the gravitational acceleration. The forces $f_X$, $f_Y$, $f_Z$ on the right-hand sides of ex. (14) are the restraining forces to be applied to the spherical mass part 20 such that the displacement of the spherical mass part 20 becomes zero, and are output from the PID operation part 142. On the left-hand sides are the external-force accelerations acting on the accelerometer. In order to operate the external-force accelerations $\alpha_X$, $\alpha_Y$, $\alpha_Z$, the output signals $f_X$, $f_Y$, $f_Z$ of the addition parts 142-1D to 142-3D of the PID operation part 142 are used; instead, the output signals of the integrating parts 142-1C to 142-3C may be used.

Figure 12A:
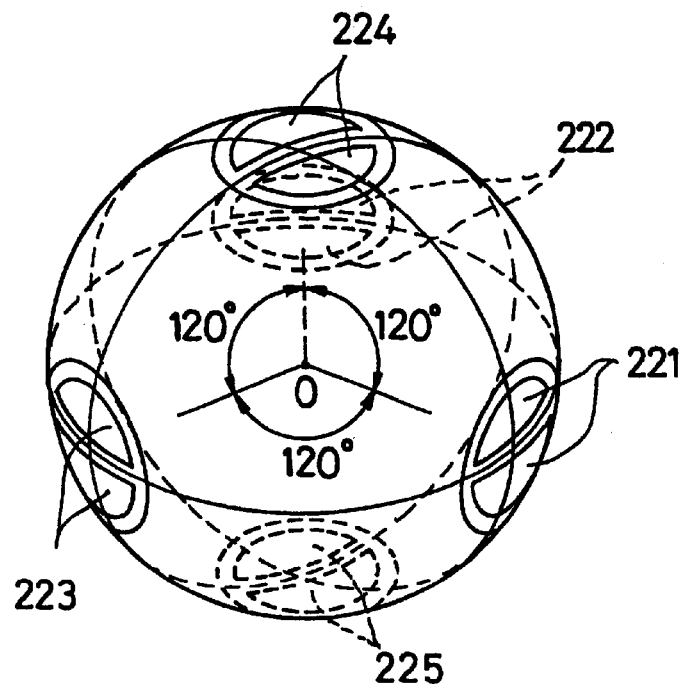
Figure 12B:
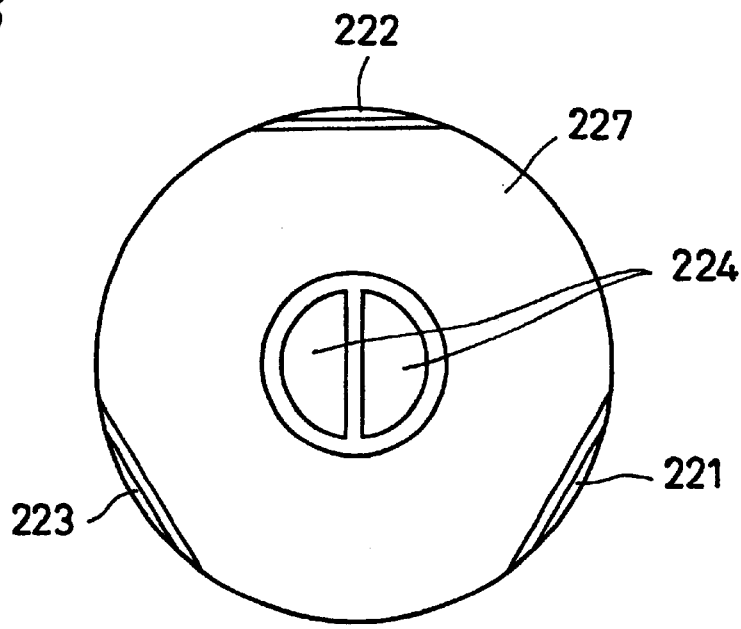

FIG. 12 shows another example of an accelerometer of this invention. In this example, the electrodes include five electrostatic supporting electrodes 221 to 225, and a displacement detection electrode 227. In this example, first, second and third electrostatic supporting electrodes 221 (221A, 221B), 222 (222A, 222B) and 223 (223A, 2253B) are positioned along the equator of the spherical mass part 20. These electrostatic supporting electrodes are positioned at equal distances at equal distances in the circumferential direction, mutually separated by a central angle of 120 Åā. The fourth and fifth electrostatic supporting electrodes 224 (224A, 224B) and 225 (225A, 225B) are positioned along the $Z_1$–$Z_2$ axis direction. In the above, embodiments of this invention have been explained in detail; however, this invention is not limited to the above embodiments, and it should be easily understood by practitioners of the art that various other configurations which do not deviate from the gist of this invention can be adopted. In this invention, because electrodes positioned surrounding and in close proximity to the spherical mass part have spherical inner surfaces, so that the gap of the capacitors formed by the spherical mass part and the electrodes is constant. Hence there is the advantage that the capacitance of the capacitors can be made large.

In this invention, an AC voltage for displacement detection, superposed on a control DC voltage, is applied to the electrostatic supporting electrodes, and there is the advantage that all displacements of the spherical mass part, that is, linear displacement in the X-, Y-, and Z-axis directions, can be detected from the output voltages of the displacement detection circuit.

In this invention, an optical-type displacement detection device including emission elements and photodetection elements, such as in electrostatic accelerometers of the prior art, are not used, and so there is the advantage that the accelerometer can be made small.

In this invention, a field-effect transistor may be used as the displacement detection circuit, and by providing this field-effect transistor adjacent to the displacement detection electrode, there is the advantage that a stable displacement detection current with minimal errors can be detected.

In this invention, there is a feedback loop in which displacements of the spherical mass part detected by the displacement detection system are fed back to the control DC voltage, so that there is the advantage that the position of the spherical mass part 20 is actively controlled, and the displacement can be quickly reduced to zero.

In this invention, the position of the spherical mass part is controlled through active control having a feedback loop, and coils and transformers such as those used in the passive resonance-type control systems of the prior art are not used, so that there is the advantage that the device can be made small.

In this invention, the position of the spherical mass part is controlled through active control, so that there is the advantage that the position of the spherical mass part can be controlled easily and accurately. In particular, there is the advantage that upon startup, the spherical mass part 20 can be easily supported buoyantly to a prescribed position.

In this invention, a single-crystal metal such as, for example, single-crystal silicon can be used in the spherical mass part, so that there is the advantage that a high-precision accelerometer device, free of the effects of temperature changes and aging, can be provided.

In this invention, control DC voltages $\pm V_{X1}$ to $\pm V_{Z2}$ of an equal absolute value but opposite in sign are applied to each pair of electrostatic supporting electrodes, so that there is the advantage that the potential of the spherical mass part can always be held at zero.

| DESCRIPTION OF REFERENCE NUMERALS | |
|---|---|
| 20 | SPHERICAL MASS PART |
| 21 | CASING |
| 23 | BRIDGE |
| 25 | PROTECTIVE FILM |
| 26 | GAP |
| 35 | DISPLACEMENT DETECTION CIRCUIT |
| 140 | CONTROL OPERATION PART |
| 141 | DISPLACEMENT OPERATION PART |
| 142 | PID OPERATION PART |
| 143 | CONTROL VOLTAGE OPERATION PART |
| 144 | CONTROL VOLTAGE GENERATOR |
| 150 | ACCELERATION OUTPUT OPERATION PART |
| 221, 222, 223, 224, 225, 226 | ELECTROSTATIC SUPPORTING ELECTRODES |
| 227 | DISPLACEMENT DETECTION ELECTRODE |

What is claimed is:

1. An accelerometer, having a spherical mass part, of either single-crystal or polycrystalline silicon, which is levitated by electrostatic supporting forces, and a plurality of electrodes, having spherical inner surfaces, which are positioned symmetrically and so as to surround said spherical mass part.

2. The accelerometer according to claim 1, being characterized in that said electrodes comprise a plurality of electrostatic supporting electrodes, and a displacement detection electrode positioned between said electrostatic supporting electrodes.

3. The accelerometer according to claim 2, being characterized in that each of said electrostatic supporting electrodes comprises a pair of electrode parts.

4. The accelerometer according to claim 2, being characterized in that
said electrostatic supporting electrodes comprise six electrostatic supporting electrodes, positioned along three mutually orthogonal axes.

5. The accelerometer according to claim 2, being characterized in that said electrostatic supporting electrodes and said displacement detection electrode are mutually connected by a bridge positioned on the outer side in the radial direction, forming an integrated structure.

6. The accelerometer according to claim 5, being characterized in that said electrostatic supporting electrodes and said displacement detection electrode are supported by a spherical shell-shape casing.

7. The accelerometer according to claim 6, being characterized in that terminals connected to said electrostatic supporting electrodes and to said displacement detection electrode, and an electrical wiring pattern connected to said terminals, are positioned on the outer surface of said casing.

8. The accelerometer according to claim 7, being characterized in that the ends of said electrical wiring pattern form a prescribed array in a prescribed position on the outer surface of said casing.

9. An accelerometer, comprising:
a spherical mass part, which is levitated by means of electrostatic supporting forces;
electrostatic supporting electrodes, positioned so as to surround the spherical mass part, and a displacement detection electrode, positioned between the electrostatic supporting electrodes;
a control operation part, which applies to said electrostatic supporting electrodes a control DC voltage in order to generate said electrostatic supporting forces;
a displacement detection system, which applies an AC voltage for displacement detection, superposed on said control DC voltage, to said electrostatic supporting electrodes, and which detects displacement detection currents flowing in said displacement detection electrode and generates displacement detection voltage signals which instruct the displacement of said spherical mass part; and,
an acceleration output operation part, which inputs the output signals of said control operation part and operates the acceleration output; being characterized in that said control operation part inputs said displacement detection voltage signals output by said displacement detection circuit and operates corrections to said control DC voltages such that the displacement of said spherical mass part becomes zero, for feedback to said control DC voltages.

10. The accelerometer according to claim 9, being characterized in that said displacement detection AC voltage comprises AC voltage components having three different displacement detection frequencies, corresponding to the linear displacements in three axis directions of said spherical mass part.

11. The accelerometer according to claim 10, wherein, if said displacement detection AC voltage applied to said first electrostatic supporting electrode is $AC_{X1}$, said displacement detection AC voltage applied to said second electrostatic supporting electrode is $AC_{X2}$, said displacement detection AC voltage applied to said third electrostatic supporting electrode is $AC_{Y1}$, said displacement detection AC voltage applied to said fourth electrostatic supporting electrode is $AC_{Y2}$, said displacement detection AC voltage applied to said fifth electrostatic supporting electrode is $AC_{Z1}$, and said displacement detection AC voltage applied to said sixth electrostatic supporting electrode is $AC_{Z2}$, then these displacement detection AC voltages are expressed by the following expressions $$AC_{X1}=-E_X=E_0\cos(\omega_1 t+\zeta_1)$$

$$AC_{X2}=+E_X=E_0\cos(\omega_1 t+\eta_1)$$

$$AC_{Y1}=-E_Y=E_0\cos(\omega_2 t+\zeta_2)$$

$$AC_{Y2}=+E_Y=E_0\cos(\omega_2 t+\eta_2)$$

$$AC_{Z1}=-E_Z=E_0\cos(\omega_3 t+\zeta_3)$$

$$AC_{Z2}=+E_Z=E_0\cos(\omega_3 t+\eta_3)$$

where $\omega_1, \omega_2, \omega_3$ are frequencies for displacement detection, and $\zeta_1, \eta_2, \eta_2, \zeta_3, \eta_3$ are phase differences, related as follows $$\eta_1=\zeta_1\pm 180°$$

$$\eta_2=\zeta_2\pm 180°$$

$$\eta_3=\zeta_3\pm 180°.$$

12. The accelerometer according to claim 9, being characterized in that each of said electrostatic supporting electrodes comprises one pair of electrode parts, and said control DC voltages applied to a pair of electrode parts are of the same magnitude and of opposite polarity.

13. The accelerometer according to claim 9, being characterized in that said control operation part comprises a displacement operation part, which operates the displacement of said spherical mass part; a PID operation part, which operates the force to be applied to said spherical mass part;

and a control voltage operation part, which operates corrections to said control DC voltages.

14. The accelerometer according to claim 13, being characterized in that said acceleration output operation part is configured so as to input the output signal of said PID operation part and operate the acceleration output.

15. The accelerometer according to claim 9, being characterized in that said spherical mass part consists of single-crystal or polycrystalline silicon.

16. A spherical sensor-type measurement device, comprising a spherical mass part which functions as an inertial force sensor; a spherical shell-shape enclosure part which surrounds said spherical mass part; a displacement detection device which detects displacements of said spherical mass part; end an electrode positioned in said enclosure part, and having a spherical-shape inner surface.

17. The spherical sensor-type measurement device according to claim 16, being characterized in that said spherical mass part is levitated by electrostatic supporting forces or magnetic forces, and is configured such that a thin gap is formed between said spherical mass part and said electrode.

18. The spherical sensor-type measurement device according to claim 16, being characterized in that said electrode comprises a plurality of electrostatic supporting electrodes, positioned symmetrically with respect to said spherical mass part.

* * * * *